US 6,748,967 B1

(12) United States Patent
Smiltneek (10) Patent No.: US 6,748,967 B1
(45) Date of Patent: Jun. 15, 2004

(54) COUPLER FOR JOINING ACTUATOR AND VALVE

(75) Inventor: Gerald Patrick Smiltneek, Sussex, WI (US)

(73) Assignee: Uniplex Corporation, Pewaukee, WI (US)

( * ) Notice: Subject to any disclaimer, the term of this patent is extended or adjusted under 35 U.S.C. 154(b) by 204 days.

(21) Appl. No.: 10/103,111

(22) Filed: Mar. 21, 2002

(51) Int. Cl.⁷ .................. F16K 43/00; F16K 1/22; F16K 1/163
(52) U.S. Cl. .................. 137/315.17; 137/315.22; 25/58; 25/292; 403/337; 403/373
(58) Field of Search .................. 137/315.17, 315.22; 251/58, 292; 403/337, 345, 373

(56) References Cited

U.S. PATENT DOCUMENTS

| | | | |
|---|---|---|---|
| 3,650,506 A | * 3/1972 | Bruton | 251/58 |
| 4,046,350 A | * 9/1977 | Massey et al. | 251/58 |
| 4,087,074 A | * 5/1978 | Massey et al. | 251/58 |
| 4,633,897 A | 1/1987 | Effenberger | |
| 4,719,939 A | 1/1988 | Killian | |
| 4,887,634 A | 12/1989 | Killian | |
| 5,203,370 A | * 4/1993 | Block et al. | 137/312 |
| 5,240,030 A | 8/1993 | Wang | |
| 5,564,461 A | 10/1996 | Raymond, Jr. et al. | |
| 5,634,486 A | 6/1997 | Hatting et al. | |
| 5,927,682 A | 7/1999 | Gul et al. | |
| 5,954,088 A | 9/1999 | Huang | |
| 6,135,417 A | 10/2000 | Wadsworth et al. | |

OTHER PUBLICATIONS

Valve coupler materials from www.vanaireinc.com (date unknown).

* cited by examiner

*Primary Examiner*—George L. Walton
(74) *Attorney, Agent, or Firm*—Craig A. Fieschko, Esq.; DeWitt Ross & Stevens S.C.

(57) ABSTRACT

Couplers for joining actuators to valves are configured to allow their affixment to different makes and models of actuators and valves, thereby allowing an off-the-shelf S coupling solution and avoiding the need to specially construct a coupler which is only adapted to connect whatever valve and actuator that are desired for coupling. The couplers include a shaft/stem bore which accommodates the torque-transmitting components of the valve and actuator to be coupled, and sets of affixment holes surround the shaft/stem bore, with these affixment holes being arrayed in patterns matching those of different common valves and actuators. Thus, a coupler may affix to different valves or actuators provided the appropriate affixment holes are chosen. The couplers may be formed as single-piece or multi-piece units. For example, rather than using a single-piece coupler, the coupler may be formed as a pair of coupler sections wherein each coupler section is configured to attach to one or more valves or actuators, and the coupler sections may then be affixed to each other. By providing a user with a variety of differently-configured coupler sections, the user may simply choose coupler sections which are appropriate for attachment to the valve or actuator in question, and may then affix the coupler sections together to complete the coupler and thereby affix the valve to the actuator.

25 Claims, 7 Drawing Sheets

COUPLER FOR JOINING ACTUATOR AND VALVE

FIELD OF THE INVENTION

This disclosure concerns an invention relating generally to components for mechanized/automated actuation of valves, and more specifically to components for coupling valves to pneumatic, hydraulic, electromagnetic, or other forms of actuators whereby the valves may be remotely actuated.

BACKGROUND OF THE INVENTION

Manually-actuated valves, which are actuated by grasping their handles and rotating them to turn their valve stems and thereby modify fluid flow through the valve, are well known. It is often desirable to modify manually-actuated valves so that they may be remotely or automatically actuated by some type of industrial actuator, e.g., a pneumatic actuator, hydraulic actuator, electromagnetic actuator, or other form of actuator providing a rotary input. When valves are modified in this manner, the valve handle is removed from the valve stem, and the valve stem is then connected to an actuator shaft, or to a transmission shaft extending between the actuator shaft and valve stem. The actuators are generally small components with trailing hoses or wires, and they need to be anchored to some portion of the valve or its environment so that rotation of the actuator shaft provides a positive torque input to the valve. Without such anchoring, rotation of the actuator shaft will merely cause the actuator to spin about the valve stem when it is actuated. Rather than building some form of expensive and space-consuming supporting framework which affixes the actuator to the valve's environment, it is usually preferable to somehow affix the housing of the actuator to the housing of the valve so that the actuator and valve are held in fixed relation when the actuator shaft communicates torque to the valve stem.

However, problems commonly arise when attempts are made to couple actuators to valves in this manner. Valves are generally not specifically designed for coupling to valves, and they have a wide variety of sizes and shapes, making it difficult to develop an off-the-shelf coupling solution. Actuators generally do not have such a wide variety of possible configurations and are thus less problematic than valves, but they are nonetheless problematic as well. The actuator and valve housings can sometimes be welded together (or a bridge can be welded therebetween), or other permanent forms of affixation can be used, but these measures are not preferred because of the difficulty in later repair and replacement of the valve and/or the actuator, and also because of the potential damage that may occur to most common actuators if welding is used.

The step that is most commonly taken to achieve a removable affixation between an actuator and a valve is to provide a structure generically known as a "coupler" between the actuator and the valve, with the coupler being configured to join certain categories of valves to certain categories of actuators and serve as a bridge therebetween. Examples of couplers of this nature are seen in U.S. Pat. No. 4,633,897 to Effenberger, 4,719,939 to Killian, U.S. Pat. No. 4,887,634 to Killian, U.S. Pat. No. 5,240,030 to Wang, U.S. Pat. No. 5,564,461 to Raymond, Jr. et al., U.S. Pat. No. 5,634,486 to Hatting et al., U.S. Pat. No. 5,927,682 to Gul et al., U.S. Pat. No. 5,954,088 to Huang, U.S. Pat. No. 6,135,417 to Wadsworth et al. and Japanese Patent No. JP406066327A to Yabanetta.

However, these couplers are subject to several disadvantages. First, a coupler's primary goal is to rigidly fix the valve housing with respect to the actuator housing, while mechanically linking the valve stem to the actuator shaft to allow torque transmittal. However, the attachment of the valve and actuator housings often tends to cause problems with torque transmittal because it introduces misalignment between the axes of the valve stem and actuator shaft. If any eccentricity and/or pitch is present between the axes of the valve stem and actuator shaft, the components will experience significant stress and will quickly wear with repeated actuation. Even where couplers have been specifically designed to join particular makes and models of valves and actuators, this misalignment can occur owing to imprecision in aligning the valve stem and actuator shaft. Such imprecision is amplified by imprecisions in valve manufacture, since common valves are manufactured with a surprisingly high degree of variability from valve to valve, thus making it difficult for one coupler to properly fit all valves. For example, it is not uncommon to see variances of up to 5 degrees or more, as measured between the mounting plate of a valve and its valve stem, between the valve stem axes of different valves in a manufacturing run. This variability does not reflect poor quality manufacture, but rather reflects that the valve was intended for manual actuation and flow control. Thus, once the valve packings are installed so that proper valve performance is attained, the valve is suitable for use, and there is no need for its manufacturer to concentrate on its appearance, or its uniformity with other valves in the manufacturing run (or risk the valve's performance by attempting to improve these features). Since the valve will (presumably) be manually actuated, and manual actuation can readily accommodate any irregularity in valve stem orientation, such irregularity is not an important issue—unless the valve is modified for automatic actuation.

Second, where bolt holes are provided on valves and actuators for mounting, the bolt hole placement tends to be different between different manufacturers, makes, and models (though some standard hole placements exist for actuators). Thus, different couplers with different bolt hole placements are needed for each possible valve/actuator combination.

Third, most prior couplers introduce substantial space between the valve and actuator. This is generally necessary so that the coupler can be properly mounted between the valve and actuator, though it can sometimes be useful to allow a flexible transmission shaft to be inserted between the valve stem and actuator shaft to relieve the stress caused by misalignment of their axes. However, the increased space required by these couplers can be undesirable since actuators and couplers must often work in conditions of limited space.

To overcome the foregoing problems, the approach most commonly taken is to take a piece of rectangular tubing, drill holes in its opposing sides which are suitable to allow affixation of the valve and actuator to the opposite sides, and then machine a central shaft/stem bore between the opposing sides so that the actuator shaft, valve stem, and/or transmission shaft can extend between the valve and actuator within the shaft/stem bore. A coupler somewhat similar to this arrangement is seen in U.S. Pat. No. 4,633,897. Since each coupler is custom-made, it is naturally compatible with whatever proposed valve and actuator configurations are in issue, and its maker can fashion it so that it readily accommodates any manufacturing irregularities. However, it is inconvenient to have to rely on the custom generation of couplers each time one is desired. Custom generation is time-consuming, and requires that one maintain an inventory of rectangular tube stock for use in making couplers.

Thus, it would be desirable to have couplers available which do not require custom manufacture, and which may simply be pulled off the shelf to accommodate whatever valve and actuator pair that is proposed for coupling. Ideally, such a coupler would be compact and would not space the actuator so far away from the valve that use of the coupler in confined environments is effectively precluded. Additionally, it would be useful if such a coupler would at least partially compensate for the problem of shaft misalignment between the valve stem and actuator shaft, and the stress and wear that such misalignment can cause on the actuator and valve.

SUMMARY OF THE INVENTION

The invention involves a coupler which is intended to at least partially solve the aforementioned problems. To give the reader a basic understanding of some of the advantageous features of the invention, following is a brief summary of preferred versions of the coupler. As this is merely a summary, it should be understood that more details regarding the preferred versions may be found in the Detailed Description set forth elsewhere in this document. The claims set forth at the end of this document then define the various versions of the invention in which exclusive rights are secured.

Preferred versions of the coupler are intended to couple standard actuators, which have actuator mounting holes defined therein about an actuator shaft, to standard valves, which include valve mounting holes defined therein about a valve stem. Preferred couplers include an actuator mounting side and an opposing valve mounting side, wherein the actuator mounting side is adapted to mount a selected actuator thereon and the valve mounting side is adapted to mount a selected valve thereon. A series of actuator affixment holes extend into the actuator mounting side, with the actuator affixment holes being arrayed identically to actuator mounting holes defined in the selected actuator, thereby allowing fasteners to extend from the actuator affixment holes to the actuator mounting holes of the selected actuator and affix the selected actuator to the actuator mounting side. Similarly, a series of valve affixment holes extend into the valve mounting side, with the valve affixment holes being arrayed identically to valve mounting holes defined in the selected valve so that fasteners may extend from the valve affixment holes to the valve mounting holes of the selected valve and affix the selected valve to the valve mounting side. A shaft/stem bore also extends between the mounting sides to accommodate a valve stem, actuator shaft, and/or transmission shaft whereby torque may be transmitted from the selected actuator to the selected valve. To allow the coupler to effectively become "universal" so that it may affix to valves and/or actuators other than the selected valve and actuator, a series of surplus affixment holes extend into one or more of the actuator mounting side and the valve mounting side, with the surplus affixment holes being arrayed differently than the actuator mounting holes of the selected actuator and the valve mounting holes of the selected valve. These surplus affixment holes are spaced from the actuator affixment holes and the valve affixment holes, and are arrayed identically to at least one of actuator mounting holes defined in an actuator other than the selected actuator, and valve mounting holes defined in a valve other than the selected valve. Thus, the coupler may be fastened between different sets of actuators and valves. To do so, one or more of the selected actuator and the selected valve are removed from one of the mounting sides to allow a second actuator or second valve to affix to the same mounting side in its place, with the second actuator or second valve being affixed to this mounting side by fasteners extending into the surplus affixment holes.

When a coupler is used to affix an actuator to a valve in the aforementioned manner, the valve stem, actuator shaft, and/or transmission shaft of the valve and actuator extend through the shaft/stem bore to transmit torque from the actuator to the valve. To reduce the distance between the actuator and valve and thereby reduce the effects of valve stem and actuator shaft misalignment, cavities may be formed in at least one of the mounting sides of the coupler to receive a portion of the valve or actuator therein (for example, a boss protruding from the valve) when the valve and actuator are affixed to the coupler. The valve or actuator will therefore be partially received within the coupler to allow it to rest closer to its opposing actuator or valve. Preferably, these cavities are formed in at least one of the mounting sides of the coupler, and extend partway between the mounting sides of the coupler. These cavities are preferably defined by one or more slots, since bosses protruding from valves and/or couplers are often defined by one or more protruding elongated bars. Additionally, the cavities preferably extend from and open onto the shaft/stem bore, since bosses protruding from valves and/or couplers are generally located adjacent the valve stem and/or actuator shaft. Apart from allowing closer coupling of the valve and actuator, such cavities are also beneficial in that they can be formed to complementarily receive any bosses protruding from valves and/or couplers, and the interfitting relationship between the bosses and the cavities can assist in preventing relative rotation between the valve and actuator when the actuator shaft transmits torque to the valve stem.

Couplers having the foregoing characteristics need not be formed as single-piece units, and may instead be formed as a pair of coupler sections. In this version of the invention, a user is preferably provided with a number of coupler sections. Each coupler section may include one of the aforementioned mounting sides, and may also include an opposing juncture side having juncture fastening holes formed therein. The juncture side of each of the coupler sections is contoured so that it may abut the juncture side of one of the other coupler sections with the coupler sections having aligned juncture fastener holes, thereby allowing the coupler sections to be fastened together by inserting fasteners through their juncture fastener holes. The coupler sections may be formed in such a manner that they are identical save for their affixment holes, i.e., the affixment holes of the coupler sections may be differently sized and shaped between the various coupler sections, so that each coupler section can be affixed to different sets of actuators and valves. Thus, to construct a coupler which may affix a selected actuator to a selected valve, the user need simply select a first coupler section having affixment holes suitable for fastening the first coupler section to the selected actuator, and a second coupler section having affixment holes suitable for fastening the second coupler section to the selected valve. After each coupler section is affixed to its actuator or valve, the coupler sections may then be fastened together at their juncture fastening holes to thereby complete the assembly of the coupler (and thereby couple the actuator and valve).

Since the versions of the coupler which utilize a pair of coupler sections require that the coupler sections be fastened together at their juncture sides after their affixment sides are fastened to the valve and actuator, the juncture fastening holes are preferably defined on flanges extending from the juncture side of each coupler section so as to provide greater working room and clearance for accommodating fasteners. Similarly, it is preferable to define flanges on the mounting sides of each coupler section, and define the affixment holes in these flanges. Any flanges on the mounting side are preferably defined in planes spaced from any flanges on the juncture side, with the axes of the affixment holes having their axes spaced from the axes of the juncture fastening holes.

Further advantages, features, and objects of the invention will be apparent from the following detailed description of the invention in conjunction with the associated drawings.

DETAILED DESCRIPTION OF PREFERRED EMBODIMENTS OF THE INVENTION

Figure 1:
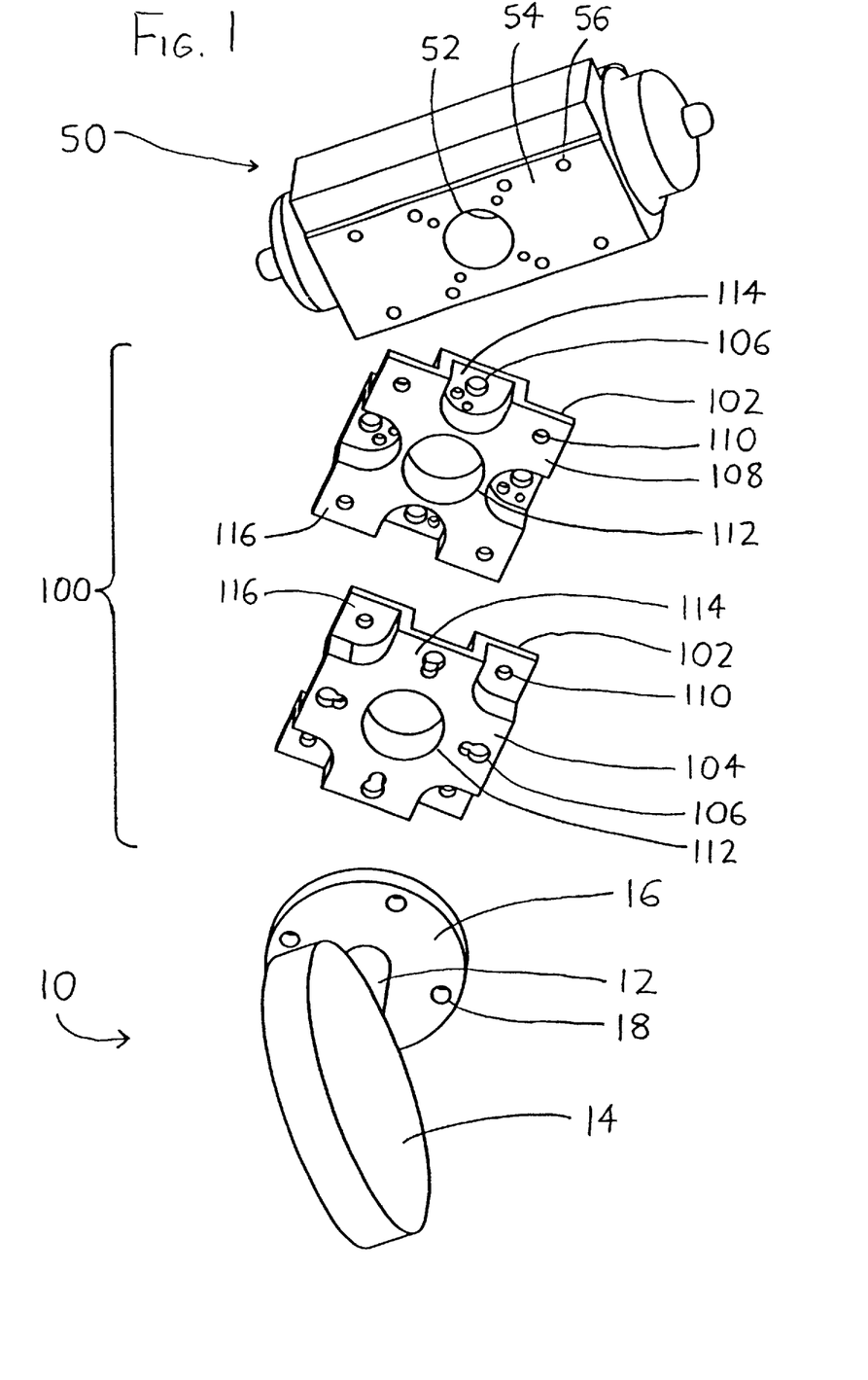
FIG. 1 is an exploded perspective view of a first exemplary version of the invention involving a two-piece coupler.

Turning to FIG. 1, a portion of a butterfly valve 10 is depicted. Flow conditions within the valve 10 are altered by rotating a valve stem 12 to cause corresponding rotation of a valve plate 14, which obstructs flow within a valve housing (which is not shown, save for a mounting plate 16 which surrounds the valve stem 12). The valve stem 12 is surrounded by and rotatably mounted within the mounting plate 16. The valve stem 12 is rotated from the exterior of the valve 10, at a point above the mounting plate 16, with this portion of the valve stem 12 being obscured by the mounting plate 16 in FIG. 1 and thus not being visible. The mounting plate 16 has several valve mounting holes 18 defined therein about the valve stem 12. As previously noted, different valves 10 may be differently configured, with one particular problem for couplers being that the valve mounting holes 18 may be differently arrayed between different manufacturers, makes, and models of valves, thus making it difficult to develop an off-the-shelf coupling system wherein a variety of couplers may be connected to a variety of actuators.

A common pneumatic actuator 50 is also shown in FIG. 1. The actuator 50 has an actuator bore 52 wherein a gear, shaft, or other rotating component is provided (with all such rotating components hereinafter being generically referred to as the "actuator shaft"). When the actuator 50 is activated by signals from pneumatic lines (not shown), the actuator shaft rotates, and thereby drives the valve stem 12 provided the actuator shaft is connected to the valve stem 12, either directly or via an intermediate transmission shaft. As is common with actuators of this nature, the actuator 50 has a mounting face 54 having several actuator mounting holes 56 defined therein about the actuator bore 52 and the actuator shaft.

After an actuator 50 is chosen to drive a particular valve 10, the pattern of the valve mounting holes 18 usually does not match the pattern of the actuator mounting holes 56. Thus, a coupler must be interposed between the valve 10 and actuator 50 and affixed to the valve mounting plate 16 and actuator mounting face 54 to fix the housings of the valve 10 and actuator 50 in place with respect to each other. If the valve stem 12 and actuator shaft are not directly affixed, a transmission shaft can be extended between the valve stem 12 and the actuator shaft within the actuator bore 52, and thus rotation of the actuator shaft will cause rotation of the valve stem 12.

However, prior couplers tend to have one or more of the disadvantages discussed earlier. The invention overcomes some or all of these disadvantages by providing a coupler such as the exemplary coupler 100 depicted in FIG. 1. The coupler 100 is formed of a pair of coupler sections 102, with the coupler sections 102 being identical save for certain features to be discussed shortly. Each coupler section 102 includes a mounting side 104 which is contoured to abut at least a portion of the valve mounting plate 16 or actuator mounting face 54 (with only the mounting side 104 of the lower coupler section 102 being visible in FIG. 1). The mounting side 104 of each coupler section 102 has affixment holes 106 defined therein to allow insertion of appropriate fasteners through the affixment holes 106 and into the valve mounting holes 18 or actuator mounting holes 56, thereby affixing each coupler section 102 to its adjacent valve 10 or actuator 50. A juncture side 108 is also provided on each coupler section 102 opposite its mounting side 104 (with only the juncture side 108 of the upper coupler section 102 being visible in FIG. 1). The juncture sides 108 of the coupler sections 102 are contoured so that they may abut each other and be affixed together by insertion of appropriate fasteners through juncture fastening holes 110 defined in the juncture sides 108. A shaft/stem bore 112 extends between the mounting side 104 and juncture side 108 of each of the coupler sections 102 such that when the coupler sections 102 are joined together at their juncture sides 108, the shaft/stem bores 112 coaxially align to accommodate one or more of the valve stem 12, actuator shaft, and/or any transmission shaft extending therebetween.

In practice, it is contemplated that a user may be provided with numerous coupler sections 102 having essentially the same configuration, save for differently-sized and/or differently-placed affixment holes 106. The affixment holes 106 are situated on the different coupler sections 102 to allow each one to fasten to some subset of the common varieties of valves 10 and/or actuators 50 (with valves 10 being of greater concern owing to the extremely wide variety of valves 10 available, and the wide variety in the arrangements of their valve mounting holes 18). For example, one coupler section 102 might have affixment holes 106 which are sized, shaped, and placed appropriately for valve models A1, B1, and C1 and actuators X1, Y1, and Z1; another coupler section 102 might be manufactured to be compatible with valve models A2, B2, and C2 and actuators X2, Y2, and Z2; and so forth. However, the fastening holes 110 would be similarly sized and placed on all coupler sections 102 so that any coupler section 102 may be readily affixed to any other coupler section 102. Thus, for any coupler and valve combination, the user may simply select a first coupler section 102 having affixment holes 106 which are arrayed appropriately for the actuator mounting holes 56, and a second coupler section 102 having affixment holes 106 which are arrayed appropriately for the valve mounting holes 18, and may affix the coupler sections 102 to the valve 10 and actuator 50 via insertion of appropriate fasteners. The juncture sides 108 of the coupler sections 102 may then be brought towards each other, and the juncture sides 108 may be placed in abutment, with the valve stem 12 and actuator shaft connected within the shaft/stem bore 112. Appropriate fasteners may then be inserted through the juncture fastening holes 110 to affix the coupler sections 102 together.

So that the foregoing attachments between coupler sections 102, valve 10, and actuator 50 are more easily accomplished, the affixment holes 106 and juncture fastening holes 110 are evenly spaced about the shaft/stem bore 112 to help distribute stresses, and to maintain ample work space when operating on fasteners within the holes 106/110 (i.e., to avoid tool/fastener interference when operating on fasteners within these holes). Additionally, the affixment holes 106 are preferably provided in flanges 114 defined on the mounting sides 104 of the coupler sections 102 so that when one situates the mounting side 104 of one coupler section 102 on the mounting plate 16 of the valve 10, or situates the mounting side 104 of one coupler section 102 on the mounting face 54 of the actuator 50, and fasteners are then inserted through the affixment holes 106 into the valve mounting holes 18 or actuator mounting holes 56, clearance is provided adjacent the mounting side flanges 114 and along the axes of the mounting holes 18/56 whereby the head of a wrench or other tool may easily manipulate the fastener head without interference. This operating clearance is maintained even after the valve 10 and actuator 50 are fully coupled by joining the two coupler sections 102 at their juncture sides 108. Similarly, the juncture fastening holes 110 are preferably provided on flanges 116 defined on the juncture sides 108 of the coupler sections 102 so that when the juncture sides 108 of the coupler sections 102 are brought together, clearance is provided along the axes of the juncture fastening holes 110 and adjacent the juncture side flanges 116 so that a tool may easily manipulate these fasteners. Since the juncture side flanges 116 on the juncture side 108 are situated in a plane spaced from the plane of the mounting side flanges 114 of the mounting side 104, clearance is maintained once the valve 10 and actuator 50 are coupled.

Looking more closely at the mounting sides 104 shown in FIG. 1 and the mounting side flanges 114 extending therefrom, it is useful to review certain features of the affixment holes 106 used to fasten the mounting sides 104 to the valve mounting plate 16 and the actuator mounting face 54. The affixment holes 106 are preferably provided in arrayed sets of similarly-sized and shaped holes, with the top coupler section 102 in FIG. 1 depicting an arrangement wherein three sets of four holes are provided, with the four holes within each set being arrayed in a pattern suitable for alignment with some make and model of valve 10 or actuator 50. The bottom coupler section 102 depicts an arrangement of affixment holes 106 wherein two sets of four holes are provided. The affixment holes 106 of the different sets may be distinct (i.e., spaced apart with non-overlapping boundaries, as depicted by the top coupler section 102 shown in FIG. 1), or they may overlap (as depicted by the bottom coupler section 102). When a user is to choose a coupler section 102 to affix to a valve 10 or actuator 50, the user may select coupler sections 102 which appear to have affixment holes 106 which are appropriately sized and shaped for use with the valve 10 and actuator 50 in question. The mounting side flanges 114 of the coupler sections 102 are placed adjacent to an actuator mounting face 54 or a valve mounting plate 16, and the coupler sections 102 are translated and/or rotated so that appropriate ones of the various affixment holes 106 are aligned with the valve mounting holes 18 and actuator mounting holes 56. If alignment is not achieved, the user may select a different coupler section 102 having affixment holes 106 which are more appropriately sized, shaped, and/or placed. Usually, only one of the affixment holes 106 provided in any mounting side flange 114 will be appropriate for affixment in an adjacent actuator mounting face 54 or a valve mounting plate 16. For sake of more specific discussion, these affixment holes 106 which are capable of adjacent alignment with the valve mounting holes 18 and actuator mounting holes 56 of the valve 10 or actuator 50 in question, and which are to be used for fastening of the coupler section 102 to the valve 10 or actuator 50 in question, may be referred to as valve affixment holes when they are used to affix a coupler section 102 to a valve mounting plate 16, or may be referred to as actuator affixment holes when they are used to affix a coupler section 102 to an actuator mounting face 54. Any remaining affixment holes 106 left on the mounting side 104 of a coupler section 102 which are not used to affix the coupler section 102 to an adjacent valve 10 or coupler 50 may be referred to as surplus affixment holes, this name being used because these extra holes are left unused with the present valve/actuator, but they effectively allow a coupler section 102 to affix to a greater variety of other differently-configured valves 10 and/or actuators 50. Thus, the top coupler section 102 in FIG. 1 can be regarded as including a set of four actuator affixment holes 106 (these being used for affixment to the actuator 50) and two sets of four surplus affixment holes 106 (which are not used for affixment to the actuator 50, but which might be used for affixment to other valves 10 or actuators 50 if the coupler section was to attach to these components instead). Similarly, the bottom coupler section 102 in FIG. 1 can be regarded as including a set of four valve affixment holes 106 (these being used for affixment to the valve 10) and one set of four surplus affixment holes 106 (which are not used for affixment to the valve 10, but which might be used for affixment to other valves 10 or actuators 50 if the coupler section was to attach to these components instead).

It should be understood that the affixment holes 106 depicted in FIG. 1 are merely exemplary in their size and placement, and one or more sets of additional surplus affixment holes 106 having different sizes, shapes, and/or placements may be provided on the mounting side flanges 114 to allow the coupler of section 102 to be attached to other different valves 10 and/or actuators 50. Alternatively, it is possible that each coupler section 102 could be provided with only a single set of affixment holes 106 configured for alignment with only a particular model of valve 10 or actuator 50, and no extra surplus affixment holes need be provided. In this case, a user would need to select and assemble the appropriate pair of particular coupler sections 102 having appropriate valve/actuator affixment hole 106 placements in order to assemble an operational coupler 100.

While the coupler 100 could be made of metal, as with past couplers, its coupler sections 102 are preferably formed of food grade high-density plastic, most preferably plastic having a melting point approaching 500° F./260° C. Such plastic will not creep or distort under standard operating conditions, but will provide a close seal with an adjacent valve 10 or actuator 50 when fastened thereon. Additionally, where coupler sections 102 are provided without affixment holes 106 or with only a single actuator or valve affixment hole 106, the coupler sections are easily machined to add affixment holes 106 to adapt them for attachment to whatever valves 10 or actuators 50 are at hand.

Figure 2:
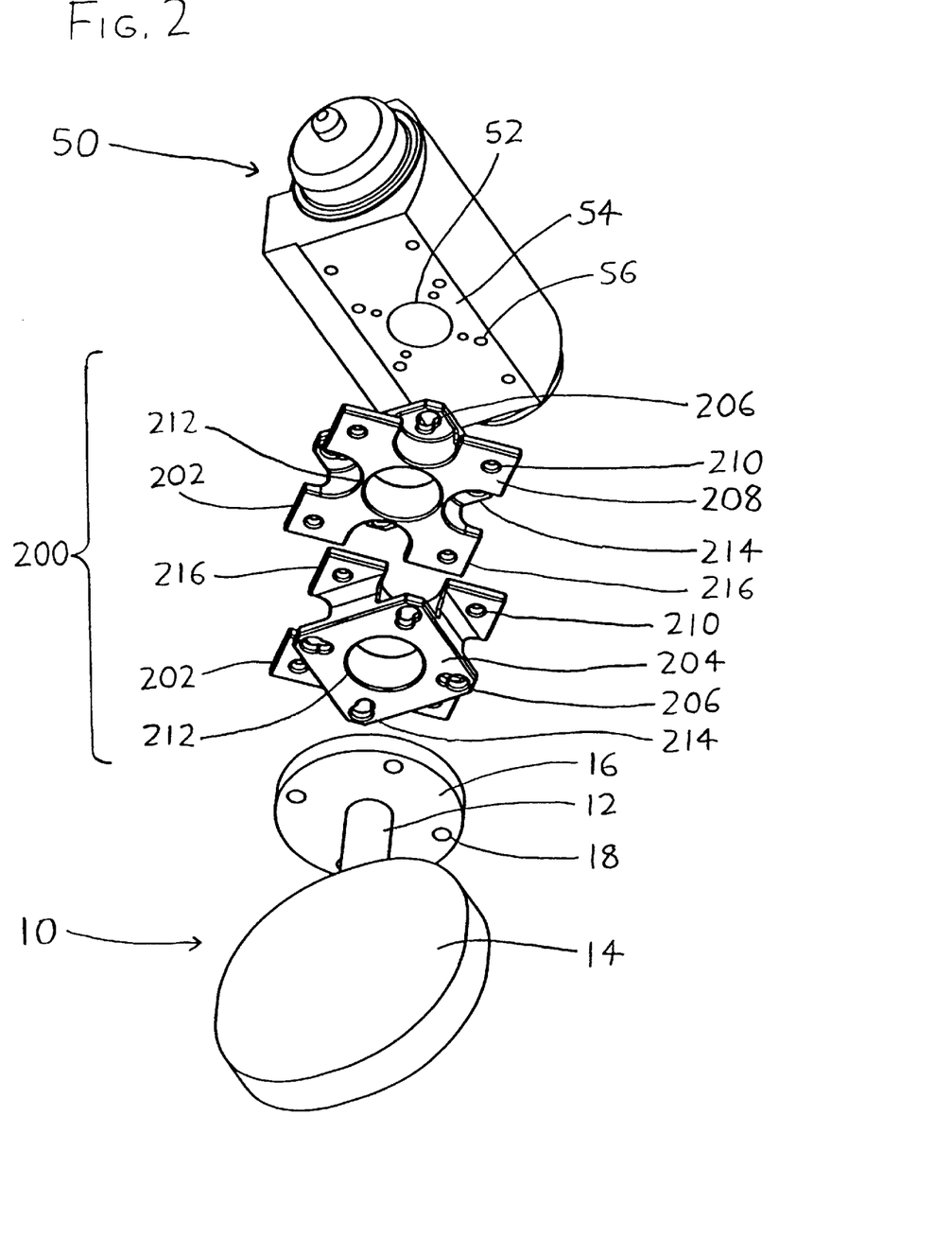
FIG. 2 is an exploded perspective view of a second exemplary version of the invention involving a two-piece coupler.

The invention is not confined to coupler sections having the configuration shown in FIG. 1, and coupler sections having different forms are also possible. An example is illustrated in FIG. 2, wherein a coupler 200 has coupler sections 202 with actuator/valve mounting sides 204 intended for attachment to valves 10 and actuators 50 via mounting side affixment holes 206 (with only the mounting side 204 of the lower coupler section 202 being visible), and opposing juncture sides 208 bearing juncture side fastening holes 210 through which fasteners may be inserted to affix the coupler sections 202 together at their juncture sides 208 (with only the juncture side 208 of the upper coupler section 202 being visible). The affixment holes 206 and fastening holes 210 are distributed about a shaft/stem bore 212, and are respectively defined within mounting side flanges 214 and juncture side flanges 216. The top coupler section 202 includes actuator affixment holes 206 which may be aligned with the actuator mounting holes 56 of the actuator 50 depicted in FIG. 2, and adjacent surplus affixment holes sized and placed for alignment with the mounting holes of other differently-configured valves or actuators (which are not depicted). The bottom coupler section 202 similarly includes valve affixment holes 206 which may be aligned with the valve mounting holes 18 of the valve 10, and adjacent surplus affixment holes sized and placed for alignment with the mounting holes of other differently-configured valves or actuators (which are not depicted). The affixment holes 206 are provided on mounting side flanges 214 on the mounting side 204, and the fastening holes 210 are provided on juncture side flanges 216 on the juncture sides 208, with the mounting side flanges 214 and juncture side flanges 216 protruding in cantilevered fashion from each coupler section 202 so that greater clearance is provided for tools to work on fastener heads; compare the mounting side flanges 214 of FIG. 2 with the mounting side flanges 114 of FIG. 1.

Figure 3:
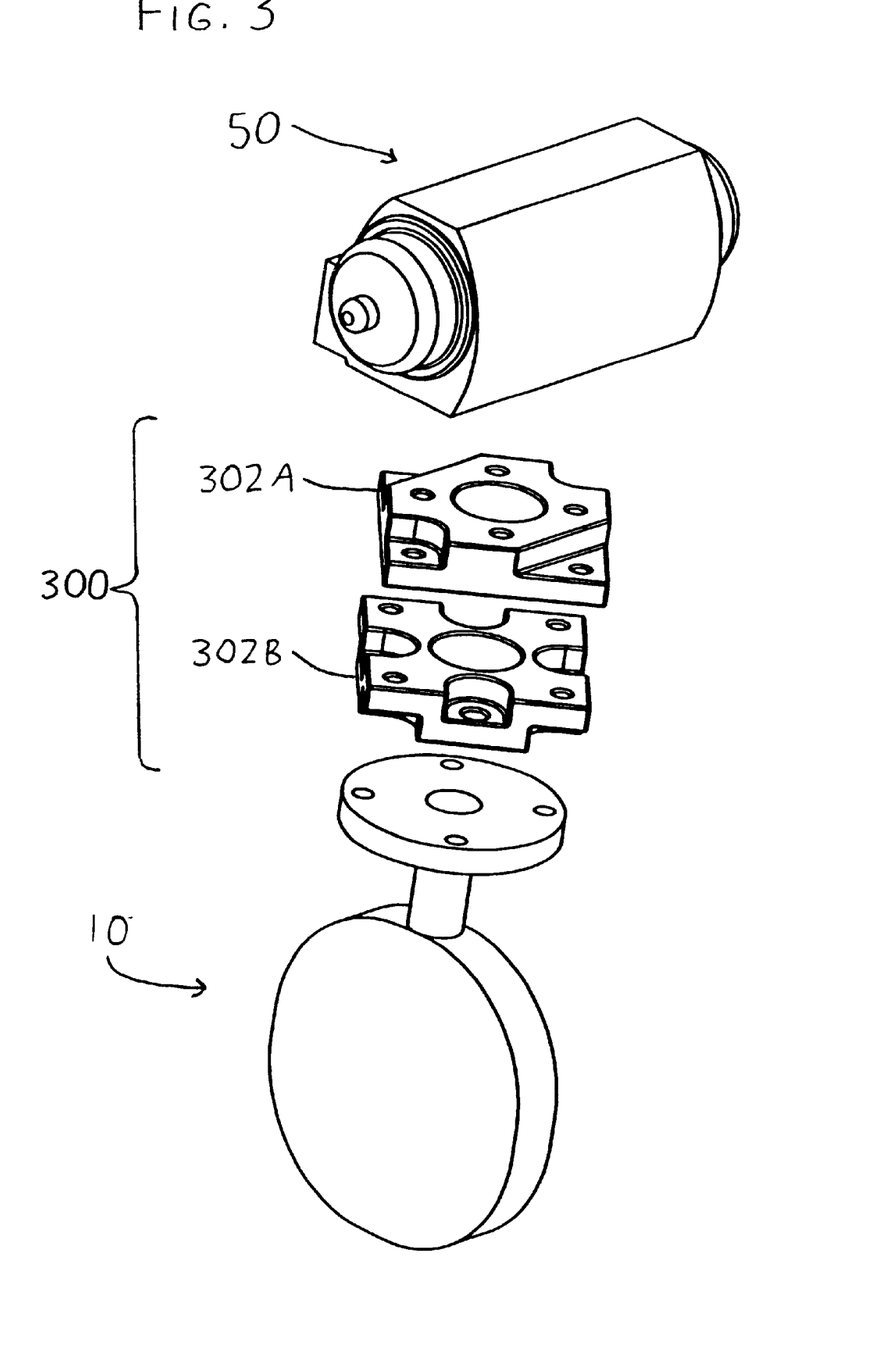
FIG. 3 is an exploded perspective view of a third exemplary version of the invention involving a two-piece coupler.

Couplers such as the couplers 100 and 200 of FIGS. 1 and 2 are useful insofar as a manufacturer need only make a single type of body for the coupler sections 102/202, and may then simply bore differently-sized and differently-placed affixment holes 106/206, suitable for alignment with different valves 10 or actuators 50, into them. Then, if a user has a variety of different coupler sections 102/202 on hand, they may couple a wide variety of different valves 10 and actuators 50. However, it is not necessary that the coupler sections be identically configured (apart from their affixment holes 106/206, which will often be differently configured). To illustrate, FIG. 3 depicts an exemplary coupler 300 which differs from the couplers 100 and 200 insofar as the coupler sections 302A and 302B are not identical. It might be useful to utilize coupler sections having different configurations, with different coupler sections being compatible with different lines of couplers and actuators; for example, the configuration of coupler section 302A could be used to signify compatibility with actuators of make/model A, whereas the configuration of coupler section 302B could signify compatibility with valves of make/model B, etc. Thus, the "coding" provided by the individual configurations of the coupler sections 302A and 302B allows a user to quickly select an appropriate coupler section configuration to the valve and/or actuator at hand, and combine the appropriate coupler sections to make a coupler. Alternatively, such coding could be provided by color coding of the coupler sections 302A and 302B, imprinting the sides of the coupler sections 302A and 302B with the model numbers of the valves/actuators with which they are compatible, and so on.

Figure 4:
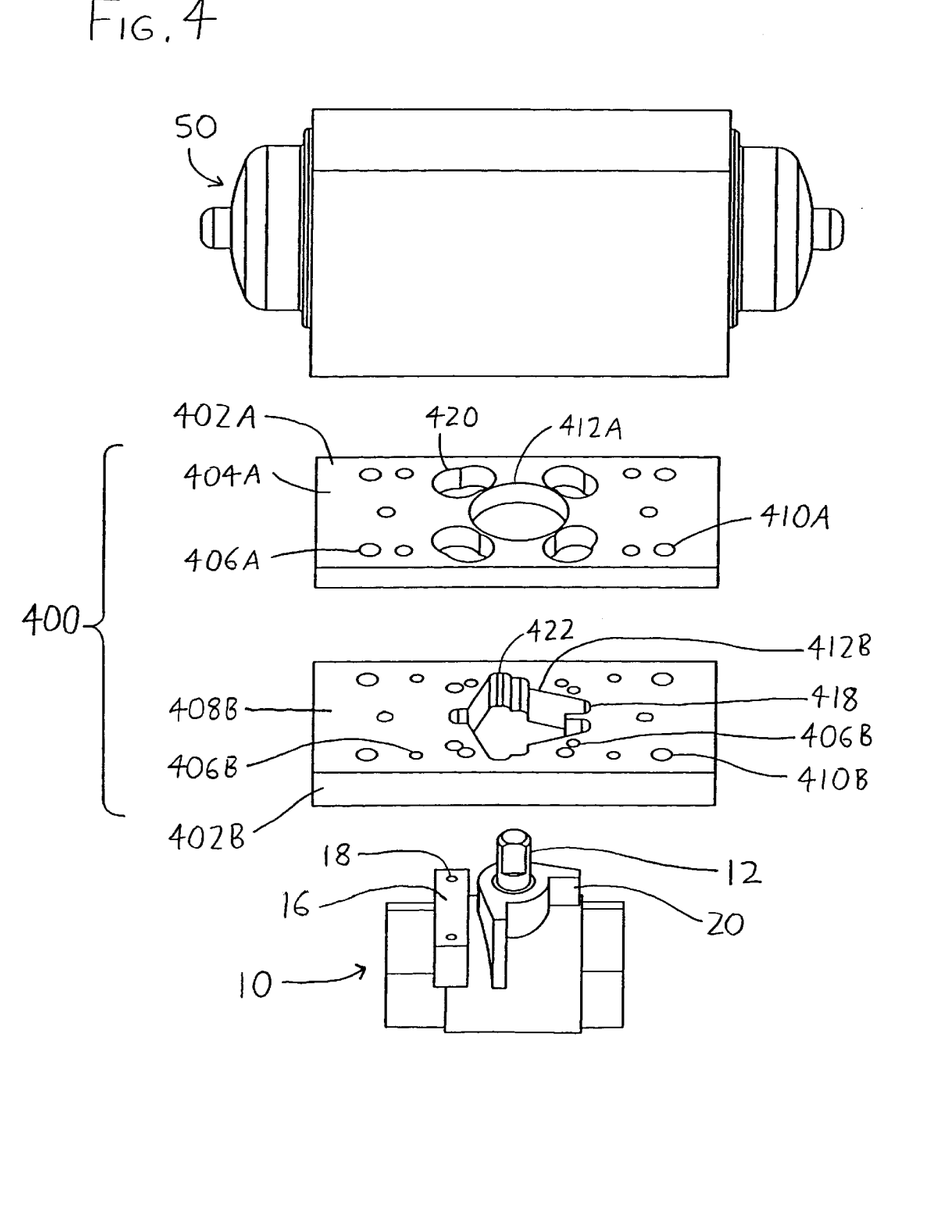
FIG. 4 is an exploded perspective view of a fourth exemplary version of the invention involving a two-piece coupler.

FIG. 4 then illustrates another exemplary coupler 400 having coupler sections 402A and 402B which are more radically different, with the coupler section 402A being an actuator coupler section which is affixed to an actuator 50 and the coupler section 402B being a valve coupler section which is affixed to a valve 10, which is in this example a ball valve rather than a butterfly or other valve. Ball valves 10 can be more difficult to affix to actuators 50 than most other forms of valves because they often include protruding bosses 20 which surround or are located near the valve stem 12. These bosses 20 interfere with the attachment of most couplers to the ball valves 10, or require couplers which greatly increase the spacing between the valve 10 and the actuator 50. Additionally, the valve mounting plates 16 and valve mounting holes 18 of ball valves are often located on only a single side of the valve stem 12, rather than surrounding the valve stem 12, which makes it more difficult to firmly couple the valve 10 and actuator 50.

The coupler 400 overcomes these problems by allowing the valve 10 to affix to the coupler 400 with a portion of the valve 10 (namely, the boss 20) received within the coupler 400. The valve coupler section 402B has a juncture side 408B and an opposing mounting side (not shown). When the coupler 400 is in use, the juncture side 408B of the valve coupler section 402B abuts an actuator juncture side (not shown) of the actuator coupler section 402A, and the opposing mounting side of the valve coupler section 402B abuts against a portion of the valve 10 for affixment. Valve affixment holes 406B are shown distributed in a pattern about a shaft/stem bore 412B defined within the valve coupler section 402B, and a series of cavities 418 is formed adjacent to the shaft/stem bore 412B in the pattern shown. These cavities 418 allow the valve coupler section 402B to fit over the valve 10 with the valve mounting plate 16 resting in abutment with the mounting side of the valve coupler section 402B so that fasteners may be inserted through appropriate valve affixment holes 406B and into the valve mounting plate 16, and with the valve stem 12 fitting through the shaft/stem bore 412B and its surrounding valve stem boss 20 closely fitting within the cavities 418. The valve affixment holes 406B which are not used to affix the valve coupler section 402B to the valve 10 constitute surplus affixment holes which may be used to affix the valve coupler section 402B to valves (other than the one depicted) having a different arrangement of valve mounting holes 18. The valve coupler section 402B also includes fastening holes 410B which are used to receive fasteners for joining the valve coupler section 402B to the actuator coupler section 402A in a manner to be described later.

The actuator coupler section 402A has a mounting side 404A and an opposing juncture side (not shown). A shaft/stem bore 412A extends between the mounting side 404A and the juncture side to receive a valve stem, actuator shaft, and/or any transmission shaft extending therebetween, and allow these components to transmit torque from the actuator 50 to the valve 10. Depressions 420 are defined in the juncture side (not shown) of the actuator coupler section 402A, with these depressions being shown in FIG. 4 as being formed sufficiently deep in the actuator coupler section 402A that they define passages extending through the actuator coupler section 402A. Fastening holes 410A also extend from the mounting side 404A to the juncture side to allow fastening of the actuator coupler section 402A to the valve coupler section 402B, and these fastening holes 410A also serve as actuator affixment holes 406A to allow the actuator coupler section 402A to be affixed to the actuator 50 in the following manner.

After the valve 10 is affixed to the valve coupler section 402B in the manner described above, the actuator coupler section 402A may be placed adjacent the valve coupler section 402B, with the juncture side (not shown) of the actuator coupler section 402A being in abutment with the juncture side 408B of the valve coupler section 402B. When this occurs, the fastening holes 410A and 410B are aligned, the shaft/stem bores 412A and 412B are aligned, and the heads of any fasteners resting within the affixment holes 406B rest within the depressions 420. However, to fasten the actuator coupler section 402A to the valve coupler section 402B, the fasteners do not simply extend between the two sections at the fastening holes 410A and 410B; rather, fasteners are inserted through the fastening holes 410B of the valve coupler section 402B from its mounting side (not shown) and into the fastening holes 410A of the actuator coupler section 402A, and then into appropriately-situated mounting holes (not shown) in the actuator. Thus, the fastening holes 410A effectively serve as actuator affixment holes 406A for affixing actuator coupler section 402A to the actuator 20, as well as fastening holes for fastening the coupler sections 402A and 402B together, since they simultaneously connect the coupler sections 402A and 402B and connect the coupler 400 to the actuator 50.

It is notable that the illustrated cavities 418 are formed such that they will receive bosses 20 having varying configurations, since valves 10 which have such bosses provide them in varying forms. The bosses 20 are preferably received in the cavities 418 in such a fashion that they (along with the affixment between the valve coupler section 402B and the valve mounting plate 16) will help anchor the valve coupler section 402B to the valve 10, particularly if they are sized to prevent rotation of the valve 10 relative to the valve coupler section 402B when the valve stem 12 is rotated. However, it should be understood that if a valve 10 has no boss, or has (for example) only a small boss 20 surrounding the valve stem 12, any surrounding cavity 418 may not receive portions of the valve in complementary fashion (and may in fact be largely unoccupied). The cavities 418 are preferably defined in such a manner that they include a number of slots 422, since the bosses 20 on most common valves 10 are defined as bars or L-shaped members extending from or adjacent to the valve stem 12 (such as on the valve 10 of FIG. 4). The slots 422 which define the cavities 418 preferably include parallel and adjacently situated slots, as well as pairs of at least substantially parallel slots resting on opposing sides of the shaft/stem bore 412B. Further, to accommodate L-shaped bosses such as those on the valve 10 in FIG. 4, these slots 422 are preferably arrayed in such a manner that at least some of them are arrayed substantially perpendicular to each other, thereby having the cavities effectively define a series of overlapping "L's" which may accommodate a number of different L-shaped bosses 20 in a number of different orientations. Thus, when an L-shaped boss such as boss 20 is received within the cavities 418 and their slots 422, the valve 10 will not be able to rotate with respect to the valve coupler section 402B.

Note that in the actuator 400, the actuator coupler section 402A does little more than serve as a spacer which accommodates the heads of the fasteners used to fasten the valve 10 to the valve coupler section 402B. It is instead possible to simply use the arrangement illustrated in FIG. 5, wherein the coupler sections 402A and 402B are integrally formed as a single unit 500 by fusing them together at their juncture sides. Here, the depressions 420 in the actuator coupler section 402A can simply be countersunk into the actuator (top) mounting side (not shown) to receive the fasteners 524 for insertion through the valve affixment holes 506B. Thus, to couple the valve 10 and actuator 50 of FIG. 5 by use of the coupler 500, the valve 10 is moved adjacent the coupler 500 so that its valve mounting plate 16 is in abutment with the valve (bottom) coupler mounting side 504, and so that the valve mounting holes (not shown) defined in the valve mounting plate 16 are aligned with the valve affixment holes 506B. The valve stem 12 extends within the shaft/stem bore 512, and the valve boss 20 is received within the slots 522 of cavities 518, which in this case extend only partway between the mounting sides 504 of the coupler 500. The valve fasteners 524 are then inserted through the appropriate valve affixment holes 506B from the actuator (top) mounting side of the coupler 500 and into the mounting holes of the valve 10. The actuator (top) mounting face of the coupler 500 is then placed in abutment with the actuator mounting face 54 such that the actuator affixment holes 506A are aligned with the actuator mounting holes 56, and actuator fasteners 526 are then inserted to affix the coupler 500 to the actuator 50. During this process, the valve stem 12 is connected to the actuator shaft within the actuator bore 52. An actuator shaft of the type commonly used by actuators such as actuator 50 is shown at 58, wherein the shaft 58 has a gear-like outer perimeter with teeth 60 defined thereon. These teeth 60 engage corresponding sockets within the actuator bore 52, and a slot 62 is defined on the shaft 58 to receive the valve stem 12 and thereby transmit the rotary input provided by shaft 58 to the valve stem 12.

Figure 5:
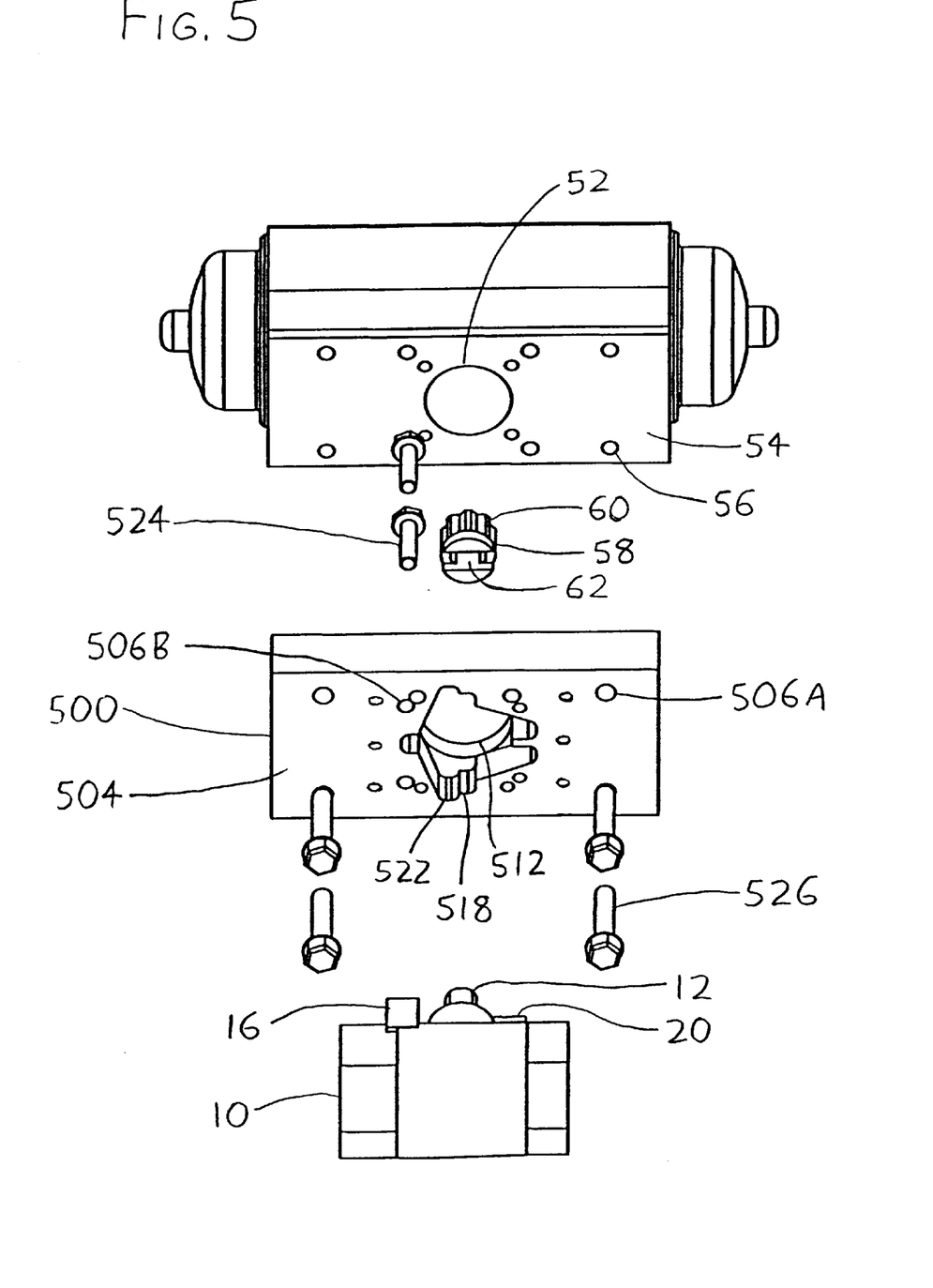
FIG. 5 is an exploded perspective view of a fifth exemplary version of the invention involving a single-piece coupler.

The various valve affixment holes 506B and actuator affixment holes 506A depicted in FIG. 5 which are not occupied by the fasteners 524 and 526 constitute surplus affixment holes whereby the valve 10 and/or the actuator 50 may be removed from the coupler 500 to allow a different valve 10 or actuator 50 to affix to the coupler 500 in its place, with the different valve 10 or actuator 50 being affixed by fasteners extending into some or all of the surplus affixment holes 506A/506B. For example, the valve fasteners 524 could be removed to remove the valve 10 depicted in FIG. 5, and the butterfly valve 10 of FIG. 1 could be used instead, with the valve fasteners 524 being inserted through different valve affixment holes 506B which are in alignment with the valve mounting holes 18 depicted in FIG. 1.

The coupler 500 is particularly advantageous insofar as the valve 10 and actuator 50 are very closely situated. This addresses the size problems that tend to arise with prior couplers which distantly space their valves and couplers, and additionally it decreases the problem of misaligned valve stem/actuator shaft axes. Consider the situation where a coupler holds a valve and actuator spaced apart in their operating positions. Such a coupler will fix the valve and actuator in positions where the valve stem and actuator shaft are coaxial (or nearly so) at the points where the stem and shaft leave the valve and actuator housings. However, if the axes of the valve stem and actuator shaft have a different angular orientation (i.e., some nonzero pitch angle is present between the stem and shaft), the greater the spacing between the valve and actuator, the greater the distances between the axes of the valve stem and actuator shaft will be. In contrast, where the valve stem and actuator shaft only extend for a very short distance before being joined, the distances between the axes will be very small. Thus, couplers such as coupler 500, which can space valves and actuators very closely together, can greatly decrease the effects of angular misalignment between actuator shafts and valve stems.

Figure 6:
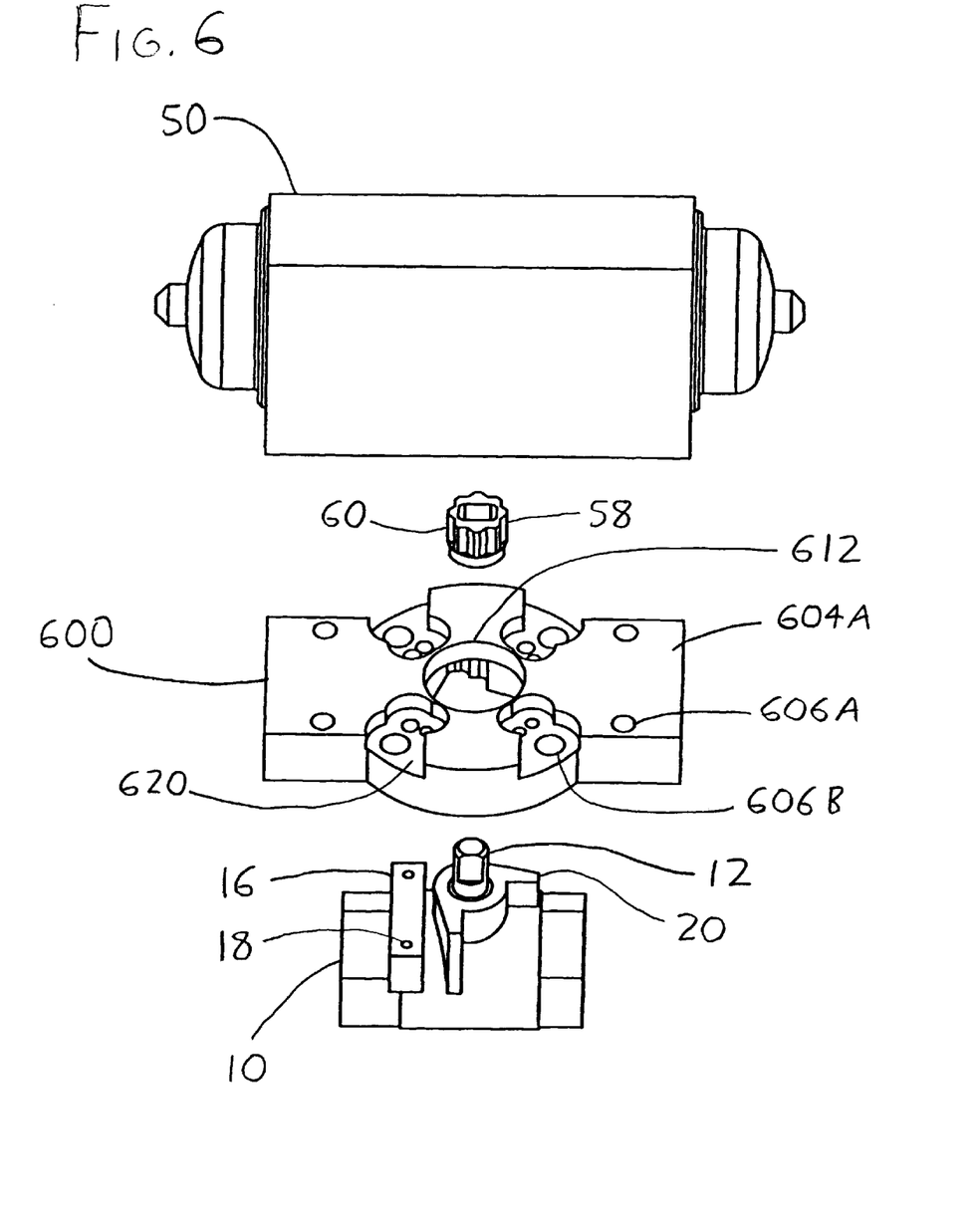
FIGS. 6 and 7 provide exploded perspective views of a sixth exemplary version of the invention involving a single-piece coupler.
Figure 7:
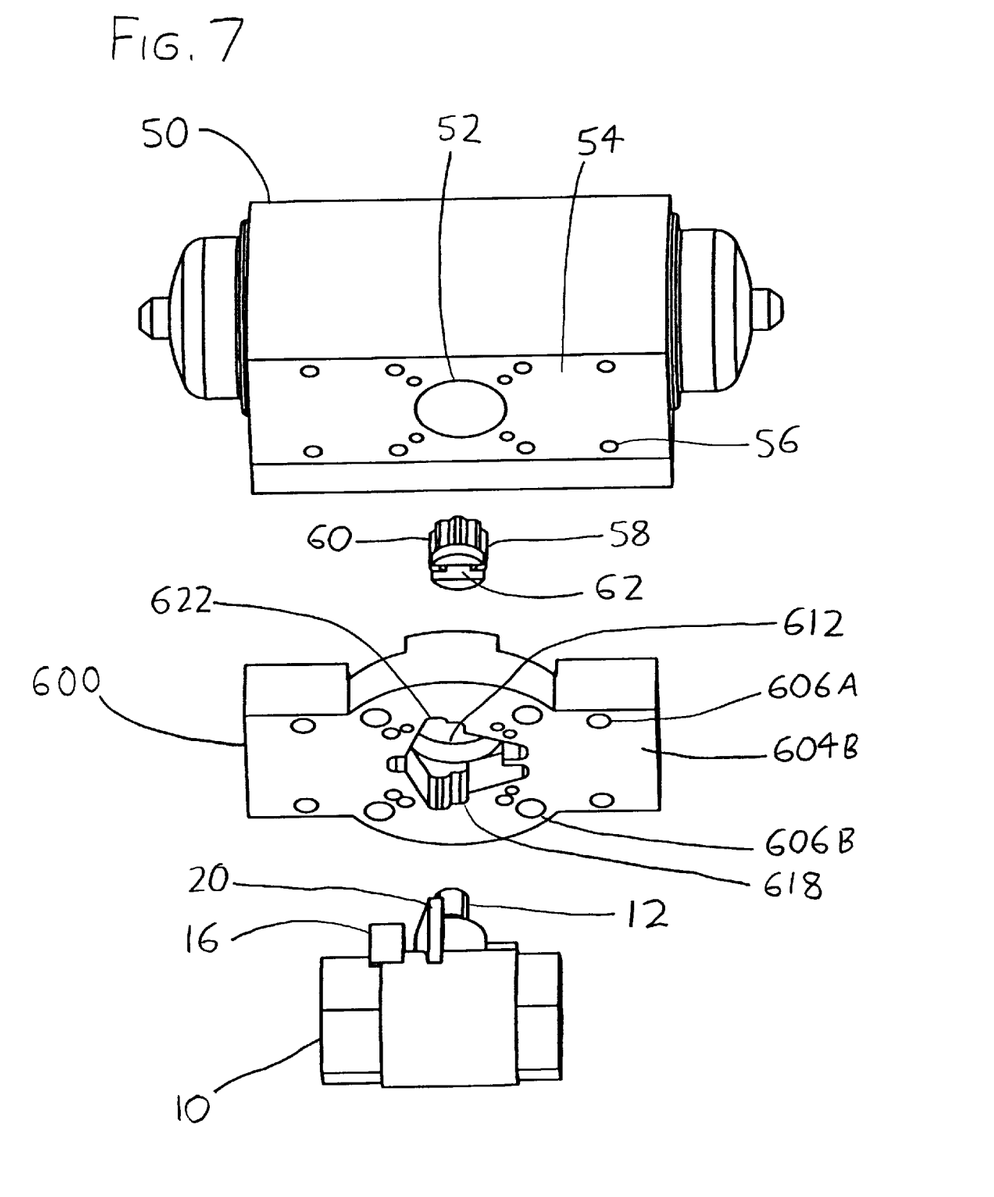

FIGS. 6 and 7 then illustrate a modified version of the single-piece coupler 500 of FIG. 5, wherein the coupler 600 is provided with an expanded midsection for greater compatibility with both butterfly valves (such as the valve 10 illustrated in FIGS. 1–3) and ball valves (such as the valve 10 shown in FIG. 7). Coupler 600 has opposing coupler mounting sides 604A and 604B (the valve mounting side 604B being shown in FIG. 7, and the actuator mounting side 604A being shown in FIG. 6), and a shaft/stem bore 612 (best seen in FIG. 6) extends between the opposing mounting sides. Cavities 618 are formed in the valve mounting side 604B shown in FIG. 7, with the cavities 618 extending partway between the mounting sides 604A and 604B and opening onto the shaft/stem bore 612. As before, the cavities 612 are defined by slots 622, including sets of slots 622 which are at least substantially parallel and adjacently situated, sets of slots 622 which are at least substantially parallel and which rest on opposing sides of the shaft/stem bore 612, and sets of slots 622 oriented at least substantially perpendicular to each other, so that various common configurations of valve bosses 20 may be accommodated. Sets of valve affixment holes 606B extend from the actuator mounting side 604A to the valve mounting side 604B so that fasteners may be inserted through appropriate ones of the valve affixment holes 606B and into the valve mounting holes 18 within the valve mounting plate 16 (shown in FIG. 6). The actuator mounting side 604A shown in FIG. 6 is countersunk adjacent the valve affixment holes 606B to define depressions 620 wherein the heads of fasteners may rest so that the fastener heads will not interfere with the actuator 10 when the actuator mounting side 604A is placed in abutment with the actuator mounting face 54 (shown in FIG. 7). Depending on the type, make, and model of valve 10 chosen, the fasteners used to affix the coupler 600 to the valve 10 will go through different ones of the valve affixment holes 606B, with generally no more than four of the valve affixment holes 606B being used at any time. The remaining unused valve affixment holes 606B constitute surplus affixment holes which are available for use when different types/makes/models of valves 10 are to be affixed to the coupler 600.

Actuator affixment holes 606A similarly extend from the valve mounting side 604B to the actuator mounting side 604A, with these actuator affixment holes 606A being arrayed in the most commonly encountered patterns used for actuator mounting holes 56 in actuator mounting faces 54 (as shown in FIG. 7). Thus, fasteners may be inserted from the valve mounting side 604B to the actuator mounting side 604A and into the actuator mounting holes 56 to affix the couplers 600 to the actuator 50. Again, as this occurs, the actuator shaft 58 is interposed between the valve stem 12 and the actuator 50 to rest within the shaft/stem bore 612.

All surplus affixment holes (i.e., all affixment holes 606A/606B which are not used for affixment to a valve 10 or actuator 50) are situated on the coupler 600 in the most commonly encountered mounting hole patterns for both valves 10 and actuators 50. Thus, the coupler 600 will accommodate a wide variety of valve 10/actuator 50 pairs. It should therefore be apparent that the foregoing couplers may be provided to allow coupling of valves and actuators having different configurations and mounting hole arrangements, thereby allowing users an off-the-shelf coupling solution rather than requiring them to custom manufacture a coupler for the valve/actuator combination in question. By providing surplus affixment holes which are configured to accommodate the most commonly encountered arrangements of valve mounting holes and actuator mounting holes, the couplers are effectively "universal" insofar as they may accommodate different valves and actuators rather than only a single make/model of valve and a single make/model of actuator. Additionally, the couplers may be designed in such a way that the coupled valve and actuator may be extremely closely spaced, thereby diminishing space concerns where valves and actuators must be coupled in a confined space. Such close coupling also reduces the effect of valve stem/actuator shaft misalignment, and the wear that such misalignment can cause, since close coupling reduces the eccentricity that angularly misaligned valve stems and actuator shafts can generate as their spacing increases.

It should be understood that the various preferred versions of the invention are shown and described above to illustrate different possible features of the invention and the varying ways in which these features may be combined. Apart from combining the different features of the foregoing versions in varying ways, other modifications are also considered to be within the scope of the invention. Following is an exemplary list of such modifications.

First, the cavities defined about the shaft/stem bore in the coupler sections of FIGS. 4–7, which receive valve bosses when the coupler sections are fit to adjacent valves, may be provided in either or both of the coupler sections of FIGS. 1–3. Naturally, the cavities would only be utilized in the coupler section which is fit to the valve (and even then the cavities would only be occupied by valve bosses if the coupler section is used with valves having such bosses). Nevertheless, if such cavities are provided in both coupler sections, then both coupler sections may be used as desired with either actuators or boss-bearing valves.

Second, while the affixment holes shown in the foregoing embodiments took the form of round holes (or in some cases slots formed of two overlapping holes), they could instead take other forms, such as generally rectangular slots, arcuate slots (which might have curvature centered about the shaft/stem bore), or other shapes. Such a measure can effectively increase the "universality" of the affixment of a coupler section to various valves and actuators by allowing the coupler section to affix to a greater variety of different valves and actuators.

Third, to assist in the attachment of a pair of coupler sections together at their juncture sides, each coupler section might be provided with pins or other protruding male structures and also complementarily-shaped female cavities on their juncture sides, with the male protrusions and female cavities being staggered by 90 degrees about the shaft/stem bore. Thus, a pair of coupler sections might be fit together about their juncture sides with coaxial shaft/stem bores, and with the male protrusions of each coupler section engaged in the female cavities of the other coupler section so that the coupler sections are restrained from having their juncture sides rotate with respect to each other, or translate with respect to each other in directions along the planes of their juncture sides. This measure can ease affixment of the coupler sections together during final assembly.

Fourth, if desired, an actuator shaft or transmission shaft which provides a lost motion coupling between the actuator shaft and valve stem may be used if eccentricity and/or pitch are still so extreme after implementation of the invention that relief measures must be taken. Lost motion extension shafts of this nature can be seen in some of the prior patents noted earlier in this document. The actuator shafts 58 illustrated in FIGS. 5–7 partially provide eccentricity relief because the slot 62 rotationally couples the valve stem 12 to the actuator shaft 58, while at the same time allowing some translation of the valve stem 12 within the slot 62.

The invention is not intended to be limited to the preferred embodiments described above, but rather is intended to be limited only by the claims set out below. Thus, the invention encompasses all alternate embodiments that fall literally or equivalently within the scope of these claims.

What is claimed is:

1. A coupler, actuator, and valve combination comprising:
    a. a first actuator having actuator mounting holes defined therein about an actuator shaft;
    b. a first valve having valve mounting holes defined therein about a valve stem;
    c. a coupler including:
        (1) opposing mounting sides,
        (2) a shaft/stem bore extending between the mounting sides,
        (3) actuator affixment holes extending into at least one of the mounting sides, the actuator affixment holes being arrayed identically to the actuator mounting holes;
        (4) valve affixment holes extending into at least one of the mounting sides, the valve affixment holes being arrayed identically to the valve mounting holes and being spaced from the actuator affixment holes;
        (5) surplus affixment holes extending into at least one of the mounting sides, the surplus affixment holes being arrayed differently from both the valve mounting holes and the actuator mounting holes, and wherein the surplus affixment holes are spaced from the actuator affixment holes and the valve affixment holes;
    wherein fasteners extend:
        (i) between the actuator affixment holes and actuator mounting holes to affix the first actuator to one of the mounting sides of the coupler, and
        (ii) between the valve affixment holes and valve mounting holes to affix the first valve to the mounting side of the coupler opposite the mounting side whereupon the actuator is affixed,
and wherein one of the first actuator and first valve may be removed from one of the mounting sides to allow a second actuator or second valve to affix to the same mounting side in its place with the second actuator or second valve being affixed to this mounting side by fasteners extending into the surplus affixment holes, and wherein the second actuator or second valve is unable to affix to this mounting side by use of the valve affixment holes or actuator affixment holes used to affix the first actuator and first valve to the coupler.

2. The combination of claim 1 wherein cavities are formed in at least one of the mounting sides of the coupler, the cavities extending partway between the mounting sides of the coupler and opening onto the shaft/stem bore, whereby the cavities may receive a portion of the first valve or first actuator therein when the first valve and first actuator are affixed to the coupler.

3. The combination of claim 1 wherein cavities are formed in at least one of the mounting sides of the coupler, the cavities defining slots extending partway between the mounting sides of the coupler and leading from the shaft/stem bore, whereby the cavities may receive a portion of the first valve or first actuator therein when the first valve and first actuator are affixed to the coupler.

4. The combination of claim 3 wherein the cavities include:
    a. a pair of at least substantially parallel and adjacently situated slots, and
    b. a pair of at least substantially parallel slots resting on opposing sides of the shaft/stem bore.

5. The combination of claim 3 wherein the cavities include slots oriented at least substantially perpendicular to each other.

6. The combination of claim 1 further comprising a cavity formed in at least one of the mounting sides of the coupler adjacent to the shaft/stem bore, the cavity extending partway between the mounting sides of the coupler, wherein portions of the valve adjacent the valve stem rest within the cavity when the valve is affixed to one of the mounting sides of the coupler.

7. The combination of claim 1 wherein the coupler comprises a pair of coupler sections, wherein each coupler section includes one of the mounting sides thereon, and also includes an opposing juncture side having juncture fastening holes formed therein,
    wherein the juncture sides of the coupler sections may be placed in abutment with their juncture fastening holes in alignment, thereby allowing the insertion of fasteners into the juncture fastening holes to fasten the coupler sections together.

8. The combination of claim 7 wherein the coupler sections are identical except for their affixment holes.

9. The coupler of claim 8 wherein the coupler sections differ in at least one of:
    a. the size of their affixment holes, and
    b. the placement of their affixment holes.

10. The combination of claim 7 wherein the juncture fastening holes are defined on flanges extending from each coupler section.

11. The combination of claim 10 wherein the flanges are situated in different planes than the mounting sides.

12. The combination of claim 10 wherein any actuator affixment holes and any valve affixment holes are defined on flanges extending from each coupler section.

13. A coupler for joining a valve and an actuator, the coupler including:
    a. an actuator mounting side contoured to rest in abutment with a selected actuator;
    b. a valve mounting side opposite the actuator mounting side, the valve mounting side being adapted to mount a selected valve thereon;
    c. a series of actuator affixment holes extending into the actuator mounting side, the actuator affixment holes being arrayed identically to actuator mounting holes defined in the selected actuator so that fasteners may extend from the actuator affixment holes to the actuator mounting holes of the selected actuator;
    d. a series of valve affixment holes extending into the valve mounting side, the valve affixment holes being arrayed identically to valve mounting holes defined in the selected valve so that fasteners may extend from the valve affixment holes to the valve mounting holes of the selected valve;
    e. a series of surplus affixment holes extending into one or more of the actuator mounting side and the valve mounting side, the surplus affixment holes being arrayed differently than the actuator mounting holes of the selected actuator and the valve mounting holes of the selected valve, but wherein the surplus affixment holes are arrayed identically to at least one of:
        (i) actuator mounting holes defined in an actuator other than the selected actuator, or
        (ii) valve mounting holes defined in a valve other than the selected valve, whereby the coupler may be fastened between different sets of actuators and valves.

14. The coupler of claim 13 in combination with an actuator and a valve, wherein:
    a. the actuator is fastened to the coupler via fasteners extending from its actuator mounting holes to the actuator affixment holes or to the surplus affixment holes, and b. the valve is fastened to the coupler via fasteners extending from its valve mounting holes to the valve affixment holes or to the surplus affixment holes.

15. The coupler of claim 13 wherein:
a. a shaft/stem bore extends between the actuator mounting side and the valve mounting side,
b. a cavity is formed adjacent to the shaft/stem bore in at least one of the actuator mounting side and the valve mounting side, the cavity extending partway between the actuator mounting side and the valve mounting side, whereby the cavity may receive a portion of the selected valve or selected actuator therein.

16. The coupler of claim 13 wherein the coupler is formed of a pair of coupler sections, one of the coupler sections having the actuator mounting side thereon and the other of the coupler sections having the valve mounting side thereon, and wherein the coupler sections are joined at abutting juncture sides.

17. The coupler of claim 16 wherein the juncture sides include flanges, and wherein the coupler sections are joined at their flanges.

18. The coupler of claim 17 wherein the actuator mounting side and valve mounting side each include flanges thereon, and wherein the actuator affixment holes and valve affixment holes are defined in these flanges.

19. A coupler for joining a valve and an actuator comprising a pair of coupler sections, each coupler section including:
a. a mounting side contoured to abut a portion of an actuator or a valve, wherein the mounting side has affixment holes defined therein to allow an actuator or valve to be fastened to the mounting side; and
b. an opposing juncture side having juncture fastening holes formed therein, wherein the juncture side of each of the coupler sections is contoured to abut the juncture side of the other of the coupler sections with the coupler sections having aligned juncture fastener holes to allow the coupler sections to be fastened together,
wherein the coupler sections are identical save for their affixment holes,
whereby each coupler section ma have its mounting side laced in abutment with:
(1) a selected actuator having actuator mounting holes aligned with the affixment holes of the coupler section, or
(2) a selected valve having valve mounting holes aligned with the affixment holes of the coupler section,
whereupon the coupler section may be affixed to the selected actuator or valve by insertion of a fastener through the affixment holes and mounting holes, and the coupler sections may then be affixed together by insertion of fasteners through their juncture fastening holes.

20. The coupler of claim 19 wherein the coupler sections differ in at least one of:
a. the size of their affixment holes, and
b. the placement of their affixment holes.

21. The coupler of claim 19 in combination with one or more additional coupler sections, wherein at least some of the coupler sections have at least one of:
a. affixment holes sized differently than one or more of the other coupler sections in the combination, and
b. affixment holes placed differently than one or more of the other coupler sections in the combination,
and wherein the juncture side of each coupler section in the combination is contoured to abut the juncture side of any other coupler section in the combination with the juncture fastener holes of the coupler sections being aligned,
whereby a user seeking to couple a valve and an actuator may select:
(1) a first coupler section from the combination which has affixment holes suitable for fastening the valve to the mounting side of the first coupler section,
(2) a second coupler section from the combination which has affixment holes suitable for fastening the actuator to the mounting side of the second coupler section,
and then align the fastening holes of the juncture sides of the first and second coupler sections to allow their fastening.

22. The coupler of claim 19 wherein the juncture side has flanges defined thereon, and wherein the juncture fastener holes are defined in the flanges.

23. The coupler of claim 22 wherein the mounting side has flanges defined thereon, and wherein the affixment holes are defined in the flanges.

24. The coupler of claim 23 wherein the flanges of the juncture side are situated in a plane spaced from the flanges of the mounting side.

25. The coupler of claim 22 wherein each coupler section includes a stem/shaft bore extending through its mounting side, and wherein the affixment holes and juncture fastening holes are situated about the stem/shaft bore, with the affixment holes and juncture fastening holes having spaced parallel axes.

* * * * *